United States Patent [19]

Kim et al.

[11] Patent Number: 5,403,879
[45] Date of Patent: Apr. 4, 1995

[54] POLYESTER FILM AND ARTICLES MADE THEREFROM

[75] Inventors: Sang-Il Kim, Suwon-si; Moon-Sun Kim, Ansan-si, both of Rep. of Korea

[73] Assignee: SKC Limited, Suwon-si, Rep. of Korea

[21] Appl. No.: 254,319

[22] Filed: Jun. 6, 1994

[30] Foreign Application Priority Data

Jun. 9, 1993 [KR] Rep. of Korea .................. 93-10448

[51] Int. Cl.$^6$ ........................ C08K 3/22; C08K 5/42; C08K 5/3417
[52] U.S. Cl. .................................. 524/161; 524/166; 524/431; 524/492
[58] Field of Search ................. 524/94, 161, 166, 431, 524/492

[56] References Cited

U.S. PATENT DOCUMENTS

| | | | |
|---|---|---|---|
| 3,560,591 | 2/1971 | Tanaka et al. | 524/161 |
| 3,663,498 | 5/1972 | Uebe et al. | 524/161 |
| 3,702,350 | 11/1972 | Kimura et al. | 524/161 |
| 4,214,040 | 7/1980 | Meyers et al. | 524/431 |
| 4,246,378 | 1/1981 | Kometani et al. | 524/161 |
| 4,497,918 | 2/1985 | Wason | 524/492 |
| 4,713,408 | 12/1987 | Takahashi et al. | 524/161 |
| 4,721,745 | 1/1988 | Neef et al. | 524/94 |
| 4,882,375 | 11/1989 | Tyrell et al. | 524/161 |

FOREIGN PATENT DOCUMENTS

| | | |
|---|---|---|
| 241928 | 10/1987 | Japan . |
| 137927 | 6/1988 | Japan . |
| 161029 | 7/1988 | Japan . |
| 193934 | 8/1988 | Japan . |
| 185532 | 7/1990 | Japan . |
| 50241 | 3/1991 | Japan . |

*Primary Examiner*—Kriellion S. Morgan
*Attorney, Agent, or Firm*—William F. Pinsak

[57] ABSTRACT

The polyester film of the present invention comprising titanium compound, silica compound, fluorescent pigment and antistatic agent as additives is a white-colored, opaque film and has low gloss, superior surface printing and antistatic properties, and increased resistance against discoloring. The film is useful in manufacturing white boards, various magnetic cards, printing paper, packaging materials and the like.

9 Claims, No Drawings

POLYESTER FILM AND ARTICLES MADE THEREFROM

FIELD OF THE INVENTION

The present invention relates to a polyester film having improved optical and physical properties; and, more specifically, to a white-colored, opaque polyester film possessing low gloss, superior printing and antistatic surface properties and increased resistance against discoloring, and articles made therefrom.

BACKGROUND OF THE INVENTION

As well known, polyvinyl chloride and paper have been the primary material used in manufacturing various magnetic cards, e.g., telephone cards, credit cards and subway tickets. However, a magnetic card prepared from polyvinyl chloride is often felt rather inconvenient due to its considerable thickness, creating a nuisance to a user carrying several of such cards; is liable to be damaged due to its low levels of impact strength, flexibility and heat resistance; and may be deformed by heat generated during the printing process. In case that a magnetic card is prepared from paper, there also exist various problems stemming from its poor water resistance, mechanical strength, durability and the like.

Because of these deficiencies, therefore, there have been made studies for the development of a polyester film having high opacity and surface gloss suitable for the manufacture of magnetic cards. In this connection, Japanese Patent Laid-open Publication Nos. 88-161029 and 88-137927 describe the treatment of a polyester film with a particulate calcium carbonate compound; and Japanese Patent Laid-open Publication No. 87-241928 suggests the employment of TiO$_2$ and SiO$_2$ in a polyester film. Also, Japanese Patent Laid-open Publication Nos. 91-50241 and 90-185532 disclose that addition of calcium carbonate and barium sulfate to a polyester film can provide the film with improved concealability and whiteness. Further, Japanese Patent Laid-open Publication No. 88-193934 employs a titanium compound in the form of anatase together with zinc.

However, these prior art methods and compositions for producing polyester films also have a number of deficiencies. For example, titanium compounds tend to discolor the polyester film upon its exposure to a high temperature or sun light; and have the tendency to agglomerate due to the poor dispersibility thereof during the manufacture of the polyester film, rendering it difficult to prepare the polyester film with a uniform thickness and good surface property. Also, these polyester films are likely to generate static electricity, causing such problems as non-uniform printing and poor receptivity to ink during the printing process and even loss of information recorded on the magnetic cards.

SUMMARY OF THE INVENTION

Accordingly, it is an object of the present invention to provide a polyester film having improved optical and physical characteristics and superior printing and antistatic surface properties and increased resistance against discoloring.

It is a further object of the present invention to provide an article prepared from the improved polyester film.

In accordance with one aspect of the present invention, there is provided a polyester film prepared from a polyester having an intrinsic viscosity ranging from 0.4 to 0.9 dl/g, and being comprised of 60 parts by weight or more of homopolymers of a polyalkylene carboxylate and 40 parts by weight or less of copolymers of a polyalkylene carboxylate and a diol or dicarboxylic acid, which comprises the additives of:

(a) 5 to 25 parts by weight of a titanium compound having an average diameter ranging from 0.1 to 5 μm;

(b) 0.1 to 3 parts by weight of a silica compound having an average diameter ranging from 1 to 5 μm;

(c) 0.02 to 1.0 part by weight of a fluorescent organic pigment; and (d) 0.04 to 2.0 parts by weight of an antistatic agent, as a mixture of a compound represented by formula(I) and a metal sulfonate derivative, having an acid value of 1.0 mg KOH/g or less, represented by formula(II):

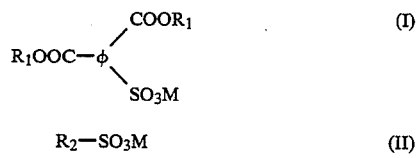

$$R_2-SO_3M \qquad (II)$$

wherein:

$R_1$ is a $C_1-C_{10}$ alkyl group;

$R_2$ is a $C_8-C_{25}$ alkyl group;

M is an alkali metal or alkaline earth metal such as Li, Na, K or Mg; and $\phi$ is a phenyl group.

DETAILED DESCRIPTION OF THE INVENTION

The polyester employed in the invention has an intrinsic viscosity ranging from 0.4 to 0.9 dl/g, and preferably from 0.5 to 0.8 dl/g, when determined at a concentration of 0.3 g per 25 ml of ortho-chlorophenol at a temperature of 35 °C. If the polyester film is manufactured from the polyester having an intrinsic viscosity of less than 0.4 dl/g, breakage frequently occurs during an elongation process thereof, thereby diminishing the productivity as well as lowering such properties as the mechanical strength of the final film. Further, if the intrinsic viscosity of the polyester exceeds 0.9 dl/g, the extrudability of the film is reduced due to the high melting viscosity.

The polyalkylene carboxylate employed in the present invention is a polycondensed resin of polyhydric organic acids and polyhydric alcohols. For the purpose of the present invention, as the organic acid, carboxylic acids, in particular, aromatic dicarboxylic acids, are preferred; and, as the alcohol, glycols, in particular, alkylene glycols, are preferred.

Representative compounds of said aromatic dicarboxylic acids include: dimethyl terephthalic acid, terephthalic acid, isophthalic acid, naphthalene dicarboxylic acid, cyclohexane dicarboxylic acid, diphenoxyethane dicarboxylic acid, diphenyl dicarboxylic acid, diphenylether dicarboxylic acid, anthracene dicarboxylic acid and α,β-bis(2-chlorophenoxy)ethane-4,4'-dicarboxylic acid. Among these, dimethyl terephthalic acid and terephtalic acid are most preferred.

Representative compounds of said alkylene glycols include: ethylene glycol, trimethylene glycol, tetramethylene glycol, pentamethylene glycol, hexamethylene glycol and hexylene glycol. Among these, ethylene glycol is most preferred.

The polyester of the present invention comprises 60 parts by weight or more of homopolymers of a polyalkylene carboxylate, preferably polyethylene terephthalate, and 40 parts by weight or less of copolymers of a polyalkylene carboxylate and a diol or dicarboxylic acid. Copolymerizable compounds to produce the copolymers may include: diol compounds such as diethylene glycol, propylene glycol, neopentyl glycol, polyethylene glycol, p-xylene glycol, 1,4-cyclohexane dimethanol and sodium 5-sulforesorcin; dicarboxylic acids such as adipic acid and sodium 5-sulfoisophthalate; and polyfunctional dicarboxylic acids such as trimelitic acid and pyromelitic acid.

The titanium compound which is used for the present invention preferably has an average diameter ranging from 0.1 to 5 μm and may preferably include a mixture of titanium dioxide having a crystalline structure in the form of anatase and a crystalline structure in the form of futile; and serves to enhance and maintain the desired degrees of whiteness and transmittance of the final polyester film. The polyester film of the present invention preferably has a degree of whiteness ranging from 80 to 110%, and more preferably ranging from 85 to 105%. If the degree of whiteness is lower than 80%, the film becomes yellowish; and, if the degree is higher than 110%, the film becomes bluish.

Further, the polyester film of the present invention preferably has a light transmittance ranging from 0.5 to 2.0%, and, more preferably, from 0.8 to 1.5%. If the value of the light transmittance is greater than 2.0%, the concealability of the film becomes poor and may reveal the backside thereof; and if the value is less than 0.5%, the strength of the film is reduced due to an excessive amount of bubbles which may remain inside the film.

As the titanium compounds which may be used in the present invention, titanium dioxide is preferred. The amount of titanium dioxide to be used depends on the thickness and application of the final polyester film and may range from 5 to 25 parts by weight. The titanium dioxide in the form of anatase and that in the form of rutile may be added in amounts of 3 to 15 parts by weight and 2 to 10 parts by weight, respectively. If the titanium dioxide mixture is added in an amount of more than 25 parts by weight, the mechanical properties of the film, for example, the strength and flexibility, may become deteriorated; and, further, the degree of whiteness and transmittance does not get improved by the addition of larger amounts of the compounds.

As the silica compounds which may be used in the present invention, silicon oxide, either wet or dry, is preferred; and the amount and average particle diameter thereof may depend on the thickness and application requirements of the final film. Preferably, the average particle diameter lies in the range from 1 to 5 μm; and the amount added may preferably range from 0.1 to 3 parts by weight.

The surface gloss of the final film is controlled by said silica compound. The polyester film of the present invention preferably has a surface gloss from 10 to 60%, and more preferably from 20 to 55%. If the value of gloss is greater than 60%, the film becomes too bright; and if the value is less than 10%, the appearance of the film becomes poor.

The fluorescent organic pigment which is used in the present invention includes those of bisbenzoazole series, which absorb light energy in the ultraviolet region and then translocate the energy into the short wavelength region of the visible light to emanate the light, thereby improving the low reflectivity of short wavelength visible light, caused by the addition of the inorganic material, e.g., silica compound. The reflectivity of the film at 440 nm, a short wavelength region of the visible light, is preferably 75% or more; and, to obtain such reflectivity, it is preferred to employ 0.02 to 1.0 part by weight of the pigment. If the amount of the pigment is less than 0.02 part by weight, the reflectivity at 440 nm is hardly increased; and if said amount is more than 1.0 part by weight, the film becomes bluish-white due to an excessive increase of the reflectivity.

The antistatic agent which is beneficially employed in the present invention is a mixture of a compound of formula(I) and a metal sulfonate derivative having an acid value of 1.0 mg KOH/g or less represented by formula(II):

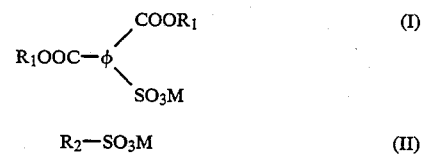

$$R_2-SO_3M \quad (II)$$

wherein:
$R_1$ is a $C_1$-$C_{10}$ alkyl group;
$R_2$ is a $C_8$-$C_{25}$ alkyl group;
M is an alkali or alkaline earth metal such as Li, Na, K and Mg; and
$\phi$ is a phenyl group.

The antistatic agent may be used in such an amount that the surface resistivity of the film is maintained at $10^{12}\Omega$ or less.

The amount of the compound of formula(I) to be added may preferably range from 0.02 to 1.0 part by weight, and more preferably from 0.05 to 0.5 part by weight. If the amount is less than 0.02 part by weight, fine fisheyes may be formed on the surface of the film to deteriorate the physical property thereof; and if the amount is more than 1.0 part by weight, degradation of the polyester occurs, thereby lowering the mechanical property and the degree of whiteness of the film. Representative examples of said compound of formula(I) include: sodium 3,5-dicarbo-methoxybenzenesulfonate, sodium 3,5-dicarboethoxybenzenesulfonate, sodium 3,5-dicarbopenthoxybenzenesulfonate, lithium 3,5-dicarbo-methoxybenzenesulfonate and potassium 3,5-dicarbo-penthoxybenzenesulfonate.

The metal sulfonate derivative of formula(II) which is used in the present invention preferably has an acid value of 1.0 mg KOH/g or less and is used in an amount of 0.02 to 1.0 part by weight, and, more preferably, from 0.05 to 0.8 part by weight. Exemplary compounds of formula(II) include: metal sulfonate derivatives such as potassium octylbenzenesulfonate, potassium nonylbenzenesulfonate and potassium undecylbenzenesulfonate or a mixture thereof. Since these metal sulfonate derivatives possess superior heat resistance and excellent compatibility with the compounds of formula(I), addition of said derivatives together with the compounds of formula(I) to the reaction mixture imparts a superior antistatic property to the resultant film and increases the surface tension thereof, thereby enhancing the receptivity to ink and coating composition.

Further, the polyester film of the present invention preferably has a surface tension greater than 45 dyne/cm so as to have a good receptivity to ink and various coating compositions.

The additives to be incorporated in the inventive polyester film, i.e., titanium compound, silica compound, fluorescent pigment and antistatic agent, can be added by either of the following two methods. One of them is to dissolve each additive at a concentration required by the specific application requirements into the final film by using ethylene glycol to give a slurry and then directly add the resultant slurry to the reaction mixture during the transesterification or polycondensation step, which is preferred for the mass production thereof. The other is a master batch chip process which comprises: preparing a polyester polycondensate containing all or a part of additives at a high concentration, then mixing the resulting polycondensation product with a separately prepared polyester polycondensate containing no additive or the remaining part of the additives, and extrusion molding the resultant mixture into the final film, whereby the contamination of the reaction vessel can be reduced. In the case of the master batch chip process, the amount of the additives can be easily controlled; and, therefore, it is suitable for a small scale production of diversified types of film.

In carrying out either of the above-mentioned two methods, the antistatic agent of formula(I) and (II) serves to inhibit the agglomeration of titanium compounds.

The polyester film of the invention may further comprise one or more known additives such as ultraviolet absorbent, heat stabilizer, polycondensation catalyst, dispersant, static build-up agent, crystallization accelerator, nucleophilic agent and anti-blocking agent in effective amounts within such ranges that do not adversely affect the characteristics of the inventive polyester film.

The extrusion molded film may be formed into an article, e.g., white board, magnetic card such as a telephone or credit card, or a subway ticket, printing paper and packaging material, by employing respective manufacturing processes known in the art.

The following Examples are intended to illustrate the present invention more specifically, without limiting the scope of the invention.

In the Examples, the properties of the polyester film were evaluated in accordance with the following methods.

1. Surface Gloss

The surface gloss of the film was measured in accordance with ASTM D523 at the angle of 60° using a black mirror as the standard mirror.

2. Degree of Whiteness

The degree of whiteness was determined in accordance with JIS-L-1015 by using the following formula:

Degree of Whiteness=4B−3G wherein B represents the percentage of the light reflected at the wavelength of 450 nm and G represents the percentage of the light reflected at the wavelength of 550 nm.

3. Transmittance

The transmittance was determined in accordance with ASTM D1003 using a sample having a diameter of 25 mm and at the scattering angle of 2.5°.

4. Color-b and Reflectivity

By way of employing a light source color difference meter (Zeniru Industrial Inc. of Japan, Model No.: SZS-Σ80), Color-b was measured at the angle of 2° using a C light source; and the reflectivity at 440 nm was determined as the percentage of the light reflected at the visible light region of 440 nm.

5. Antistatic Property

The surface resistance of the film was measured by using an insulation resistance measurement apparatus, manufactured by Hewlett-Packard Company, U.S.A., at 20° C. and at the relative humidity of 65%. The applied voltage was 500 V. The measured value was given in ohm($\Omega$) unit. As the surface resistance of the film decreases, the antistatic property thereof increases.

6. Light Resistance

The light resistance of the film was determined by measuring Color-b of the film after the Q-UV irradiation for 24 hours. By using Q-UV available from Q-Panel of the U.S., the film was mounted on a board pararell to and 12 cm apart from an UV lamp having an UV spectrum between 280 and 315 nm and then irradiated with UV by operating the UV lamp at 220 V and 0.6 to 0.8 A for 8 hours followed by condensation for 4 hours.

EXAMPLE 1

Dimethyl terephthalate and ethylene glycol were mixed in an equivalent ratio of 1:2 and a zinc compound as a transesterification catalyst was added to the resultant mixture to form a polyethylene terephthalate monomer, i.e., bis-2-hydroxyethyl terephthalate. To this were added, based on the weight of the polyester monomer, 8 parts by weight of each of titanium dioxides in the form of anatase and in the form of rutile, 0.8 part by weight of silicon dioxide, 0.25 part by weight of a bis-benzoazolic pigment, 0.15 part by weight of each of sodium 3,5-dicarboethoxybenzenesulfonate and potassium octylbenzenesulfonate, and a zinc compound as a polycondensation catalyst and an antimonic compound as a heat stabilizer, which were polycondensed to obtain a polyester polymer having an intrinsic viscosity of 0.621 dl/g. Then, the resulting product was dried and melt extruded in accordance with a conventional biaxial extension procedure, and the melt extrudate was molded into a sheet. The sheet was extended in a draw ratio of 3:1 in the longitudinal and lateral directions to provide a biaxially extended, white-colored film of polyester having the thickness of 188 μm.

As shown in Table I hereof, the polyester film prepared as above exhibit superior properties, surface resistance, and dispersiveness. Further, the film showed a value of Color-b of 0.2 after the irradiation with Q-UV for 24 hours, which demonstrates its excellent light resistance.

EXAMPLE 2

Dimethyl terephthalate and ethylene glycol were mixed in an equivalent ratio of 1:2, and a zinc compound was added to the resultant mixture to provide a polyethylene terephthalate monomer, i.e., bis-2-hydroxyethylene terephthalate. Then, a zinc compound as a polycondensation catalyst and an antimonic compound as a heat stabilizer were added; and the resulting mixture was polycondensed to give a polyester polymer chip having an intrinsic viscosity of 0.635 dl/g. To the polyester chip containing no additives were added, based on the weight of the polyester, 16 parts by weight of each of titanium dioxide in the form of anatase and in the form of futile, 1.6 parts by weight of silicon dioxide, 0.5 part by weight of a bisbenzoazolic pigment, and 0.3 part by weight of each of sodium 3,5-dicarboethoxybenzenesulfonate and potassium octylbenzenesulfonate and mixed in a continuous biaxial compounding mixer to produce a highly concentrated polyester chip containing the additives at a concentration twice higher than the level required in the final film. The highly concentrated polyester chip and the polyester chip having no additives were mixed at a ratio of 1:1, and then the resulting mixture was melt extruded, molded and extended by the conventional polyester preparation process as described in Example 1 to provide a biaxially extended, white-colored polyester film having the thickness of 188 μm.

As shown in Table I below, the film thus prepared by the master batch chip process exhibit superior properties, surface resistance and dispersiveness. Further, the film showed a value of Color-b of 0.1 after the irradiation with Q-UV for 24 hours, representing an excellent a good light resistance.

EXAMPLES 3 to 8

The procedure described in Example 2 was repeated except that the amounts of the additives employed were as shown in Table I below.

The properties of the film were measured and are presented in Table I. As shown in Table I, the film prepared in accordance with the invention possesses superior optical and physical properties.

Comparative Examples 1 to 15

The procedure described in Example 2 was repeated except that the amounts of the additives employed were as shown in Table I.

The properties of the film were measured and are presented for comparison in Table II.

TABLE I

| unit | the amount of additives employed | | | | | | properties of the film | | | | |
|---|---|---|---|---|---|---|---|---|---|---|---|
| | titanium dioxide | | silicon dioxide part by weight | fluorescent pigment (A) | antistatic agent | | | | reflectivity at 440 nm | transmittance % | gloss |
| | anatase | rutile | | | (B1) | (B2) | whiteness | Color-b | | | |
| Ex. | | | | | | | | | | | |
| 1 | 8 | 8 | 0.8 | 0.25 | 0.15 | 0.15 | 93 | −0.1 | 93.4 | 0.8 | 35 |
| 2 | 8 | 8 | 0.8 | 0.25 | 0.15 | 0.15 | 93 | −0.2 | 93.5 | 0.8 | 33 |
| 3 | 5 | 12 | 0.5 | 0.20 | 0.18 | 0.10 | 94 | −0.2 | 94.1 | 0.7 | 42 |
| 4 | 10 | 6 | 0.9 | 0.28 | 0.10 | 0.20 | 93 | −0.2 | 93.5 | 0.8 | 34 |
| 5 | 7 | 6 | 1.5 | 0.25 | 0.13 | 0.16 | 91 | −0.2 | 93.9 | 1.3 | 30 |
| 6 | 8 | 9 | 0.5 | 0.35 | 0.27 | 0.10 | 91 | −0.3 | 93.6 | 0.6 | 40 |
| 7 | 8 | 9 | 0.7 | 0.18 | 0.09 | 1.22 | 91 | −0.1 | 93.4 | 0.8 | 35 |
| 8 | 9 | 8 | 0.9 | 0.42 | 0.41 | 0.05 | 95 | 0.3 | 93.6 | 0.8 | 34 |

| unit | properties of the film | | | dispersiveness | process |
|---|---|---|---|---|---|
| | strength at break kg/mm$^2$ | light resistance (Color-b) | surface resistance Ω | | |
| Ex. | | | | | |
| 1 | 15.5 | 0.2 | $10^{10}$ | good | direction addition |
| 2 | 15.7 | 0.1 | $10^{10}$ | good | master batch |
| 3 | 16.1 | 0.2 | $10^{11}$ | good | master batch |
| 4 | 15.8 | 0.1 | $10^{10}$ | good | master batch |
| 5 | 15.7 | 0.1 | $10^{10}$ | good | master batch |
| 6 | 15.4 | 0.0 | $10^{11}$ | good | master batch |
| 7 | 15.6 | 0.2 | $10^{10}$ | good | master batch |
| 8 | 15.9 | 0.5 | $10^{11}$ | good | master batch |

TABLE II

| unit | the amount of additives employed | | | | | | properties of the film | | | | |
|---|---|---|---|---|---|---|---|---|---|---|---|
| | titanium dioxide | | silicon dioxide part by weight | fluorescent pigment (A) | antistatic agent | | | | reflectivity at 440 nm | transmittance % | gloss |
| | anatase | rutile | | | (B1) | (B2) | whiteness | Color-b | | | |
| Com. Ex. | | | | | | | | | | | |
| 1 | 16 | 0 | 0.8 | 0.25 | 0.15 | 0.15 | 91 | −0.1 | 90.3 | 0.9 | 34 |
| 2 | 8 | 7 | 0.05 | 0.25 | 0.15 | 0.15 | 94 | −0.2 | 93.4 | 0.9 | 69 |
| 3 | 8 | 7 | 7.0 | 0.25 | 0.15 | 0.15 | 94 | −0.3 | 93.2 | 1.0 | 7 |
| 4 | 7 | 8 | 0.8 | 0.01 | 0.15 | 0.15 | 80 | 1.0 | 71.2 | 0.9 | 33 |
| 5 | 7 | 8 | 0.8 | 2.8 | 0.15 | 0.15 | 91 | 1.5 | 95.4 | 1.1 | 34 |
| 6 | 8 | 9 | 0.8 | 0.25 | 0.01 | 0.02 | 95 | 0.1 | 92.9 | 0.9 | 32 |
| 7 | 9 | 8 | 0.8 | 0.25 | 0.0 | 2.0 | 82 | 1.1 | 93.6 | 0.8 | 35 |
| 8 | 8 | 8 | 0.8 | 0.25 | 2.0 | 0.0 | 81 | 1.1 | 93.4 | 0.9 | 34 |
| 9 | 8 | 8 | 0.8 | 0.25 | 2.5 | 2.5 | 79 | 1.2 | 93.8 | 0.9 | 34 |

TABLE II-continued

| | | | | | | | | | | | |
|---|---|---|---|---|---|---|---|---|---|---|---|
| 10 | 31 | 0 | 0.8 | 0.25 | 0.15 | 0.15 | 91 | −1.1 | 90.2 | 0.4 | 35 |
| 11 | 20 | 20 | 0.8 | 0.25 | 0.15 | 0.15 | 91 | −1.2 | 92.7 | 0.3 | 34 |
| 12 | 0 | 28 | 0.8 | 0.25 | 0.15 | 0.15 | 90 | −0.9 | 93.0 | 0.5 | 32 |
| 13 | 8 | 8 | 0.8 | 0.25 | 0.0 | 0.0 | 94 | −0.1 | 91.1 | 0.8 | 36 |
| 14 | 8 | 8 | 0.8 | 0.0 | 0.15 | 0.15 | 71 | 0.2 | 68.2 | 0.8 | 35 |
| 15 | 8 | 8 | 0.0 | 0.25 | 0.15 | 0.15 | 97 | −0.1 | 92.6 | 0.9 | 79 |

| | | properties of the film | | | | |
|---|---|---|---|---|---|---|
| | unit | strength at break kg/mm$^2$ | light resistance (Color-b) | surface resistance Ω | dispersiveness | process |
| Com. Ex. | | | | | | |
| 1 | | 15.3 | 2.9 | $10^{10}$ | good | " |
| 2 | | 15.8 | 0.2 | $10^{10}$ | good | " |
| 3 | | 14.8 | 0.1 | $10^{11}$ | good | " |
| 4 | | 15.4 | 1.3 | $10^{11}$ | good | " |
| 5 | | 15.7 | 1.9 | $10^{10}$ | good | " |
| 6 | | 15.2 | 0.5 | $10^{16}$ | poor | " |
| 7 | | 8.5 | 1.4 | $10^{15}$ | poor | " |
| 8 | | 9.0 | 1.5 | $10^{16}$ | good | " |
| 9 | | 8.1 | 1.4 | $10^{9}$ | good | " |
| 10 | | 6.9 | 2.8 | $10^{11}$ | poor | " |
| 11 | | 5.9 | −0.6 | $10^{10}$ | poor | " |
| 12 | | 7.2 | −0.3 | $10^{10}$ | poor | " |
| 13 | | 15.4 | 0.3 | $10^{16}$ | poor | " |
| 14 | | 15.4 | 0.5 | $10^{11}$ | good | " |
| 15 | | 15.5 | 0.3 | $10^{10}$ | good | " |

(A1): bisbenzoazole fluorescent organic pigment
(B1): sodium 3,5-dicarbo-ethoxybenzenesulfonate
(B2): octylbenzene sulfonate As described above, in accordance with the present invention, polyester film having excellent optical and physical properties can be obtained.

While the invention has been described in connection with the above specific embodiments, it should be recognized that various modifications and changes may be made within the scope of the invention as defined by the claims that follow.

What is claimed is:

1. A polyester film prepared from a polyester containing 60 parts by weight or more of homopolymers of a polyalkylene carboxylate and 40 parts by weight or less of copolymers of a polyalkylene carboxylate and a diol or dicarboxylic acid, which comprises the additives of:
   (a) 5 to 25 parts by weight of a titanium compound having an average particle diameter ranging from 0.1 to 5 μm;
   (b) 0.1 to 3 parts by weight of a silica compound having an average particle diameter ranging from 1 to 5 μm;
   (c) 0.02 to 1.0 part by weight of a bisbenzoazolic fluorescent organic pigment; and (d) 0.04 to 2.0 parts by weight of an antistatic agent as a mixture of a compound represented by formula(I) and a metal sulfonate derivative having an acid value of 1.0 mg KOH/g or less represented by formula(II):

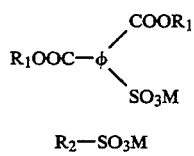

$$R_1OOC-\phi\begin{matrix}COOR_1\\SO_3M\end{matrix} \quad (I)$$

$$R_2-SO_3M \quad (II)$$

wherein:
R$_1$ is a C$_1$–C$_{10}$ alkyl group;
R$_2$ is a C$_8$–C$_{25}$ alkyl group;
M is an alkali metal or alkaline earth metal; and
φ is a phenyl group.

2. The polyester film of claim 1, wherein said polyester has an intrinsic viscosity ranging from 0.4 to 0.9 dl/g.

3. The polyester film of claim 1, wherein the titanium compound is a mixture of 2 to 10 parts by weight of a titanium compound in the form of rutile and 3 to 15 parts by weight of a titanium compound in the form of anatase.

4. The polyester film of claim 3, wherein the titanium compound is titanium dioxide.

5. The polyester film of claim 1, wherein the silica compound is silicon dioxide.

6. The polyester film of claim 1, wherein the compound of formula(I) is selected from the group consisting of sodium 3,5-dicarbomethoxybenzenesulfonate, sodium 3,5-dicarboethoxybenzenesulfonate, sodium 3,5-dicarbopenthoxybenzenesulfonate, lithium 3,5-dicarbo-methoxybenzene-sulfonate and potassium 3,5-dicarbo-penthoxybenzenesulfonate; and the compound of formula(II) is selected from the group consisting of potassium octylbenzenesulfonate, potassium nonylbenzenesulfonate, potassium undecylbenzenesulfonate and a mixture thereof.

7. The polyester film of claim 1, wherein said film has a surface resistivity of $10^{12}$Ω or less and a surface tension of 45 dyne/cm or more.

8. The polyester film of claim 1, wherein the polyalkylene carboxylate is ethylene terephthalate.

9. An article made from the polyester film recited in any of claims 1 to 8.

* * * * *